(12) United States Patent  
Kuscher et al.

(10) Patent No.: US 9,367,236 B2  
(45) Date of Patent: Jun. 14, 2016

(54) SYSTEM AND METHOD FOR PROCESSING TOUCH ACTIONS

(71) Applicants: Alexander Friedrich Kuscher, San Francisco, CA (US); Stefan Kuhne, San Jose, CA (US); John Nicholas Jitkoff, Palo Alto, CA (US)

(72) Inventors: Alexander Friedrich Kuscher, San Francisco, CA (US); Stefan Kuhne, San Jose, CA (US); John Nicholas Jitkoff, Palo Alto, CA (US)

(73) Assignee: GOOGLE INC., Mountain View, CA (US)

( * ) Notice: Subject to any disclaimer, the term of this patent is extended or adjusted under 35 U.S.C. 154(b) by 184 days.

(21) Appl. No.: 13/839,806

(22) Filed: Mar. 15, 2013

(65) Prior Publication Data

US 2015/0205425 A1 Jul. 23, 2015

Related U.S. Application Data

(60) Provisional application No. 61/710,633, filed on Oct. 5, 2012.

(51) Int. Cl.  
*G06F 3/041* (2006.01)  
*G06F 3/0488* (2013.01)

(52) U.S. Cl.  
CPC .................................. *G06F 3/04883* (2013.01)

(58) Field of Classification Search  
None  
See application file for complete search history.

(56) References Cited

U.S. PATENT DOCUMENTS

| | | | |
|---|---|---|---|
| 7,301,529 B2 | 11/2007 | Marvit et al. | |
| 8,255,836 B1 * | 8/2012 | Gildfind | 715/863 |
| 2011/0093820 A1 | 4/2011 | Zhang et al. | |
| 2011/0209099 A1 * | 8/2011 | Hinckley et al. | 715/863 |
| 2012/0016641 A1 | 1/2012 | Raffa et al. | |
| 2013/0067421 A1 * | 3/2013 | Osman et al. | 715/863 |

* cited by examiner

*Primary Examiner* — Adam R Giesy  
(74) *Attorney, Agent, or Firm* — McDermott Will & Emery LLP

(57) ABSTRACT

A system and method for processing touch actions are provided. A plurality of sequentially performed touch actions including a first touch action and a second touch action are determined on a touch interface of an electronic device. An initiation location and a completion location of each of the first and second touch actions are determined on the touch interface. A command is selected based on the determined completion location of the first touch action, the second touch action, and the determined initiation location of the second touch action. The selected command is executed on the electronic device.

17 Claims, 5 Drawing Sheets

SYSTEM AND METHOD FOR PROCESSING TOUCH ACTIONS

CROSS-REFERENCE TO RELATED APPLICATIONS

The present application claims the benefit of U.S. Provisional Patent Application Ser. No. 61/710,633, entitled "System and Method for Processing Touch Actions," filed on Oct. 5, 2012, which is hereby incorporated by reference in its entirety for all purposes.

BACKGROUND

The subject technology generally relates to processing touch actions or gestures, and in particular, relates to processing a sequence of touch actions.

Electronic devices that support a touch interface process user commands that are mapped to touch actions which can be performed on the touch interface. However, a single command is usually mapped to a single touch action. Therefore, the number of commands that can be performed by touch actions is limited to the number of different touch actions that can be performed on the touch interface.

SUMMARY

According to one aspect of the subject technology, a computer-implemented method for processing touch actions is provided. The method comprises detecting, on a touch interface of an electronic device, a plurality of sequentially performed touch actions comprising a first touch action and a second touch action. The method further comprises determining an initiation location and a completion location on the touch interface for each of the first and second touch actions. The method further comprises selecting a command based on the determined completion location of the first touch action, the second touch action, and the determined initiation location of the second touch action. The method further comprises executing the selected command on the electronic device.

According to another aspect of the subject technology, a machine-readable medium for processing touch actions is provided. The machine-readable medium comprise instructions stored therein, which when executed by a system, cause the system to perform operations comprising detecting, on a touch interface of an electronic device, a plurality of sequentially performed touch actions comprising a first touch action and a second touch action. The operations further comprise determining an initiation location and a completion location on the touch interface for each of the first and second touch actions. The operations further comprise comparing the initiation location of the first touch action and the initiation location of the second touch action. The operations further comprise comparing an action type of the first touch action and an action type of the second touch action. The operations further comprise selecting a command based on the compared initiation locations for the first and second touch actions and the compared action types of the first and second touch actions. The operations further comprise executing the selected command on the electronic device.

According to another aspect of the subject technology, an electronic device comprising a touch interface, processor, and a memory containing executable instructions which, when executed by the processor cause the processor to detect, on the touch interface, a plurality of sequentially performed touch actions comprising a first touch action and a second touch action. The instructions also cause the processor to determine an initiation location and a completion location on the touch interface for each of the first and second touch actions. The instructions also cause the processor to display a launcher on the touch interface if the first touch action is a swipe action and the initiation location of the first touch action is in a bezel section of the touch interface. The instructions also cause the processor to display a menu on the touch interface if the second touch action is a swipe action and the initiation location of the second touch action and the completion location of the first touch action are the same location on the touch interface.

Additional features and advantages of the subject technology will be set forth in the description below, and in part will be apparent from the description, or may be learned by practice of the subject technology. The advantages of the subject technology will be realized and attained by the structure particularly pointed out in the written description and claims hereof as well as the appended drawings.

It is to be understood that both the foregoing general description and the following detailed description are exemplary and explanatory and are intended to provide further explanation of the subject technology as claimed.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

In accordance with the subject disclosure, a system and a method for processing touch actions are provided. The system may include any electronic device that supports a touch interface (e.g., a touchscreen interface, a touch pad interface, etc.). Touch actions include touch gestures and/or other types of actions with respect to the touch interface that can be detected by the electronic device. According to an aspect of the subject technology, sequentially performed touch actions (e.g., multiple swipe actions, multiple press actions, combinations of different types of touch actions that are performed in a sequential order, etc.) are detected on the touch interface of the electronic device. The system determines an initiation location and a completion location on the touch interface for each of the first and second touch actions. A command may be selected based on the determined completion of the first touch action, the second touch action, and the determined initiation location of the second touch. The sequentially performed touch actions may include additional touch actions that are initiated and completed on the touch interface. In that regard, a command may be selected based on a completion location initiation location a completion location on the touch interface for each touch action of the sequentially performed touch actions.

Upon selecting the command that is mapped to the sequential touch actions, the selected command is then executed on the electronic device. User interface elements (e.g., menus, control bars, launchers, dashboards, etc.) that are associated with the selected command may be provided for display on the electronic device in response to the executed command.

Figure 1:
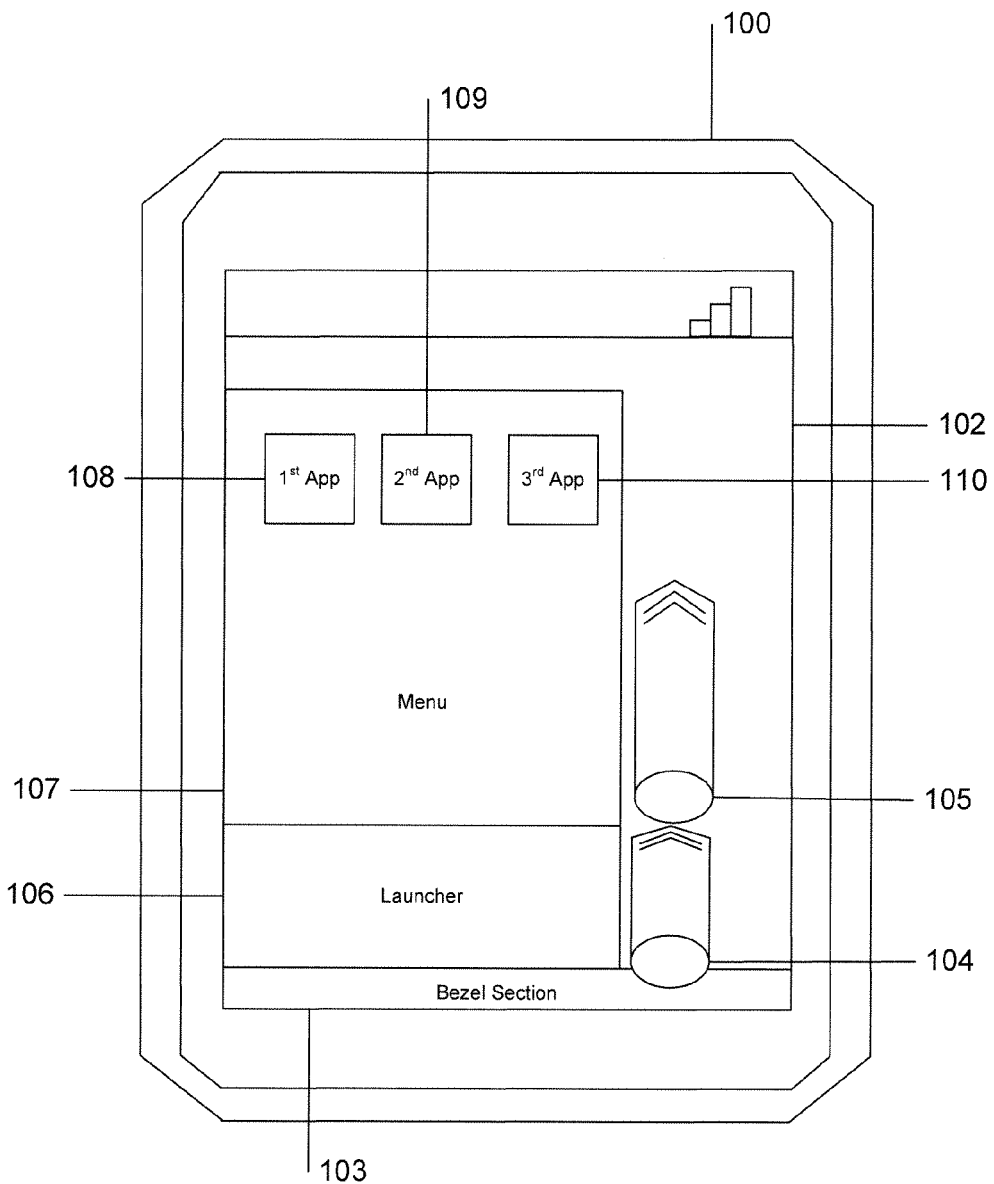
FIG. 1 illustrates an example of an electronic device for processing touch actions.

FIG. 1 illustrates an example of an electronic device for processing touch actions. In some example aspects, electronic device 100 may be any machine having a touch interface. In the example of FIG. 1, electronic device 100 is depicted as a tablet computer. Additional examples of electronic device 100 include mobile devices (e.g., smartphones, PDAs, and laptop computers), portable media players, desktop computers or other computing devices that have a touch interface.

Electronic device 100 detects on a touch interface, sequentially performed touch actions. In the example of FIG. 1, the touch interface is depicted as touchscreen interface 102. Touch interface 102 includes a bezel section 103. A sequence of swipe actions 104 and 105 begins with first swipe action 104 which initiates in bezel section 103, and completes at a first location shown in FIG. 1. The sequence continues with second swipe action 105, which is initiated at a location that is approximate to the first location and completes at a second location shown in FIG. 1. Electronic device 100 determines an initiation location and a completion location for first swipe action 104 and second swipe action 105. According to aspects of the subject technology, electronic device 100 then selects a command based on the completion location of first swipe action 104, second swipe action 105, and the determined initiation location of second swipe action 105.

In the example of FIG. 1, the sequence of swipe actions 104 and 105 is mapped to a command to provide menu 107 for display on touchscreen interface 102. In the example of FIG. 1, the interface for menu 107 provides three application icons 108-110 for display. However, if first swipe 104 is not performed at a first rate, if first swipe action 104 is not completed at or near the location shown in FIG. 1, if second swipe action 105 is not initiated at or near the location shown in FIG. 1, or if second swipe action 105 is not performed at the second rate, then the command to provide the interface for menu 107 for display on electronic device 100 may not executed.

A partial performance of the sequence of actions 104 and 105 may be mapped to a different command. In the example of FIG. 1, first swipe action 104 is mapped to a command to launch launcher 106 (e.g., application launcher, operating system launcher, task menu launcher etc.). In some examples, performance of the sequence of swipe actions 104 and 105 launches both launcher 106 and menu 107, whereas performance of first action 104 on its own, would only launch launcher 106. However, performance of first swipe action 104 followed by a third touch action that is different from second swipe action 105 may trigger a different command (e.g., powering down the electronic device).

Figure 2:
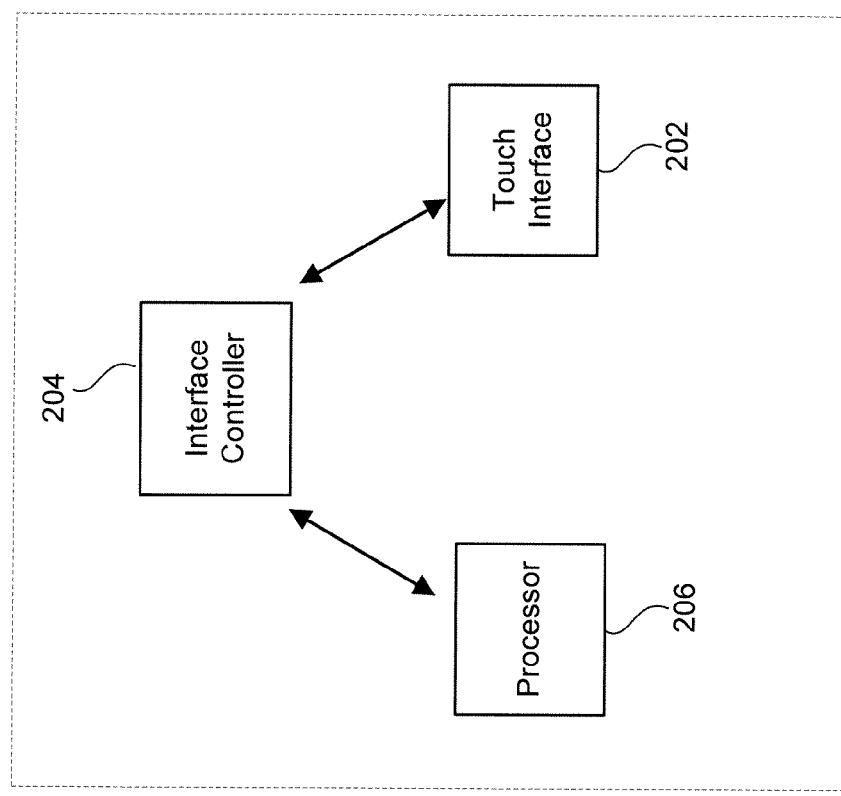
FIG. 2 illustrates an example block diagram of a system for processing touch actions.

FIG. 2 illustrates an example block diagram of a system for processing touch actions. In the example of FIG. 2, system 200 includes touch interface 202, interface controller 204 and processor 206. Touch actions (e.g., press actions, swipe actions, different sequences of touch actions, etc.) with respect to touch interface 202 are detected by interface controller 204. The interface controller periodically samples signals from touch interface 202 and provides processor 206 with signals indicating detected contacts corresponding to touch actions and the initiation locations and completion locations of the touch actions.

Processor 206, identifies, based on the received signals, whether touch actions have occurred. Processor 206 also identifies whether the touch actions belong to different types of touch actions, initiation and/or completion locations of the touch actions, and whether the touch actions belong to a sequence of touch actions. Processor 206 may also determine the rate at which the touch actions occurred, as well as other characteristics of the touch actions. The sequence of the touch actions, the rate at which the touch actions occurred and/or other characteristics of the touch actions may be used to map the touch actions to different commands.

Processor 206 may compare initiation and/or completion locations of the first touch action with the initiation and or completion locations of the second touch action. In one example, processor 206 compares the completion location of the first touch action with the initiation location of the second touch action to determine the distance between the two respective locations. In another example, processor 206 compares a rate of movement for first touch action with a rate of movement for the second touch action.

Processor 206 accesses a look-up table that maps different characteristics of the touch actions to different commands to select a command that corresponds to the characteristics of the detected touch actions. The selected command is then executed by processor 206. Processor 206 may also receive instructions to provide user interface elements that are associated with the determined command for display on a display interface of the electronic device. In that regard, processor executes the received instructions and provides user interface elements that are associated with the selected command for display.

In the example of FIG. 1, processor 206 determines an initiation location and a completion location for each of first swipe action 104 and second swipe action 105. Processor 206 then selects a command (e.g., a command to launch launcher 106) based on the determined completion location of first swipe action 104, the second swipe action 105, and the determined initiation location of second swipe action 105. Processor 206 may also determine additional characteristics about first swipe action 104 and second swipe action 105, including, but not limited to, a length of time between completion of first swipe action 104 and initiation of second swipe action 105, etc.

Processor 206 then accesses the look-up table that maps the determined characteristics of first swipe action 104 and second swipe action 105, selects a command based on the determined characteristics of first swipe action 104 and second swipe action 105, and executes the selected command. In one example, processor 206 may execute instructions to display a launcher (e.g., application launcher, operating system launcher, task manager launcher, etc.) if first swipe action 104 is determined to be a swipe type of action and is determined initiated in a bezel section of touch interface 202. Processor 206 may also execute instructions to display a menu if second swipe action 105 is determined to be a swipe type of action and the initiation of second swipe action 105 and the completion location of the first swipe action 104 are the same location on the touch interface.

Figure 3:
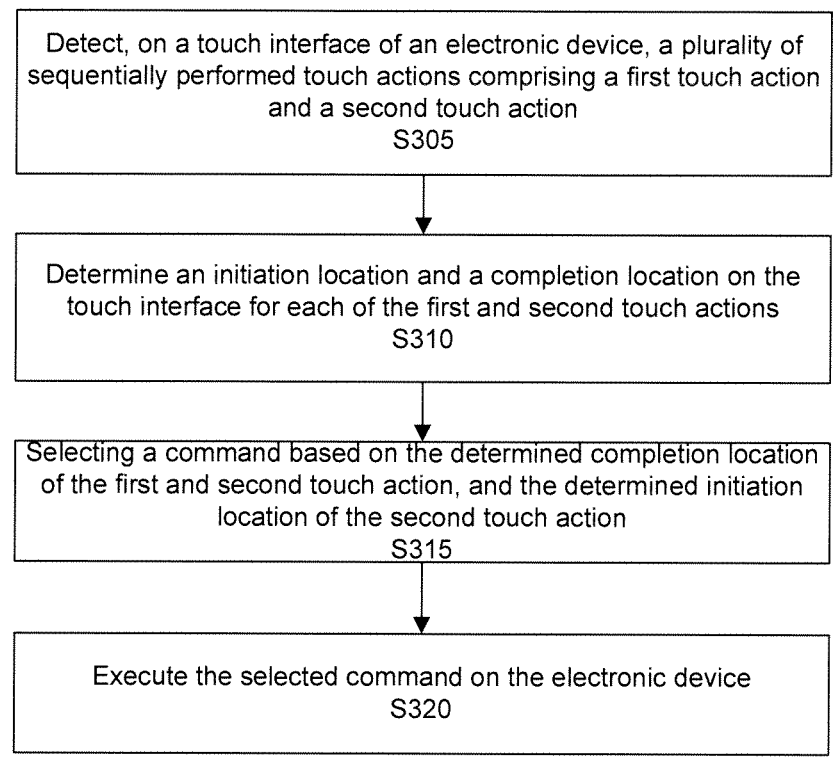
FIG. 3 illustrates an example process for processing touch actions.

FIG. 3 illustrates an example process for processing touch actions. Although the operations in process 300 are shown in a particular order, certain operations may be performed in different orders or at the same time.

In block S305, a sequence of touch actions is detected on a touch interface (e.g., a touchscreen interface, a touchpad interface, etc.) of an electronic device. The sequence of touch actions includes a first performed touch action and a second performed touch action where the second performed touch action is performed after the first performed touch action. The second performed touch action may be based on context corresponding to the first performed touch action. According to example aspects, the second performed touch action is contextually dependent on performance of the first performed touch action and/or execution of a command in response to the first performed touch action. In one example, if a sequence of touch actions includes a first performed touch action, which when executed, launches an interface, and a second performed touch action, which must be performed at and/or near a location where the interface is displayed, then the second performed touch action is contextually dependent on the interface being launched in addition to execution of the first performed touch action.

The sequence of touch actions may also include three or more touch actions. In a case where the sequence includes a first performed touch action, which is followed by a second performed touch action, which is followed by a third performed touch action, the second performed touch action is based on context corresponding to the first performed touch action (e.g., the second performed touch action is contextually dependent on the first performed touch action), and the third performed touch action is based on context corresponding to the second performed touch action (e.g., the third performed touch action is contextually dependent on the second performed touch action).

The sequentially performed touch actions may include repeated actions (e.g., swiping the touch interface multiple times, etc.) and/or different types of touch actions (e.g., a press action followed by a swipe action, followed by another press action, etc.). The sequentially performed touch actions may also include touch actions that have different initiation and completion locations. In one example, the first swipe action is initiated at a first initiation location and is completed at a first completion location and the second swipe action is initiated at a second initiation location, where the second initiation location is at or near (e.g., within a predetermined distance from the first completed location) the first completion location.

In block S310 an initiation location and a completion location are determined for each of the first and second touch actions. The determined location may be relative to the touch interface's physical structure (e.g., a location that is at or near an edge of the touch interface, a location that is at or near the center of the touch interface, etc.) and/or relative to graphical user interface elements (e.g., a location that is at or near a displayed application interface, etc.) that are displayed on the display interface.

Additional location characteristics may also be determined and used for selecting a command. In one example, a distance covered by the touch action, the proximity between the completion location of the first performed touch action and the initiation location of the second performed touch action may also be determined and used for selecting a command. For sequences that include three or more touch actions, location characteristics for the third performed touch action and beyond are also determined and used for selecting a command. In one example, the completion location of the second performed touch action and the initiation location of the third performed touch action are also determined and are used for selecting a command.

The initiation and/or completion locations of each touch action of the determined sequence of touch actions together with the types of touch actions that combine to form the sequence of touch actions may also provide characteristics that are used to map the sequence of touch actions to a specific command. In one example, a sequence of touch actions having a first set of initiation and completion locations and the same sequence of touch actions having a different set of initiation and completion locations mapped to different commands.

A rate at which each of the sequence of touch actions is performed may also be determined and may be used for selecting a command that corresponds to the sequence of touch actions. In one example, a first rate at which the first performed touch action is performed and a second rate at which the second performed touch action is performed are determined. The additional mapping characteristics may also include a rate at which the entire sequence of touch actions is performed. In one example, performing a sequence of touch actions within at a first time interval and performing the sequence of touch actions at a second time interval are mapped to different commands.

The additional mapping characteristics may also include length of intervals between successive touch actions of the sequence of touch actions. In one example, performing a sequence of touch actions at a first rate is mapped to a command to play a music video whereas performing the same sequence of touch actions at a second rate is mapped to a command to fast forward through the music video. The additional characteristics of the sequence of touch actions (e.g., a rate at which at least one of the sequentially performed touch actions is performed, etc.) may be determined and used to provide characteristics that are used to map the sequence of touch actions. A threshold limit may be designated for mapping a sequence of touch actions to a command. In one example, a sequence of touch actions is only considered as a possible command if the sequence is performed within a threshold period of time.

In block S315, a command is selected based on the determined completion location of the first, the second touch action, and the determined initiation location of the second touch action. A look-up table that maps these characteristics to a command may be accessed. The command may also be selected based on additional characteristics of the sequence of touch actions, including characteristics discussed herein, and/or any combination of the additional characteristics. In one example, the completion location of the first touch action and the initiation location of the second touch action are compared and the command is selected based on the completion location of the first touch action and the initiation location of the second touch action being the same location on the touch interface.

In another example, if a rate of movement for the first touch action and a rate of movement for the second touch action have been determined, the determined rates for the two touch actions may be compared and the command may be selected based on the comparison of the determined rates of movement for the first touch action and the second touch action. Furthermore, the command may be selected based on the determined rate of movement for the first touch action being different from the determined rate of movement for the second touch action. In another example, the initiation location of the first touch action and the initiation location of the second touch action are compared and the command is selected based on the initiation location of the first touch action and the initiation location of the second touch action being the same location on the touch interface.

Furthermore, the command may be selected based on an action type of the first touch action and an action type of the second touch action. In one example, the command is selected based on the action type of the first touch action being the same as the action type of the second touch action. In another example, if the initiation location of the first touch action and the initiation location of the second touch action have been compared and the action type of the first touch action and the action type of the second touch action have also been compared, the command may be selected based on the compared initiation locations for the first and second touch actions and the compared action types of the first and second touch actions.

Multiple commands may be mapped to a sequence of touch actions. In one example, a sequence of touch actions that includes a first performed touch action that is performed at a first rate and a second performed touch action that is performed at a second rate may be mapped to a different command than if the first performed touch action is performed at the second rate and the second performed touch action is performed at the first rate. A partial performance of the sequence may be mapped to another command. In one example the other command is executed if only the first touch action is performed at the initiation location of the first touch action. In block S320, the selected command is executed on the electronic device. User interface elements that are associated with the selected command may also be provided for display on the electronic device in response to a performance of the sequence of touch actions.

Figure 4:
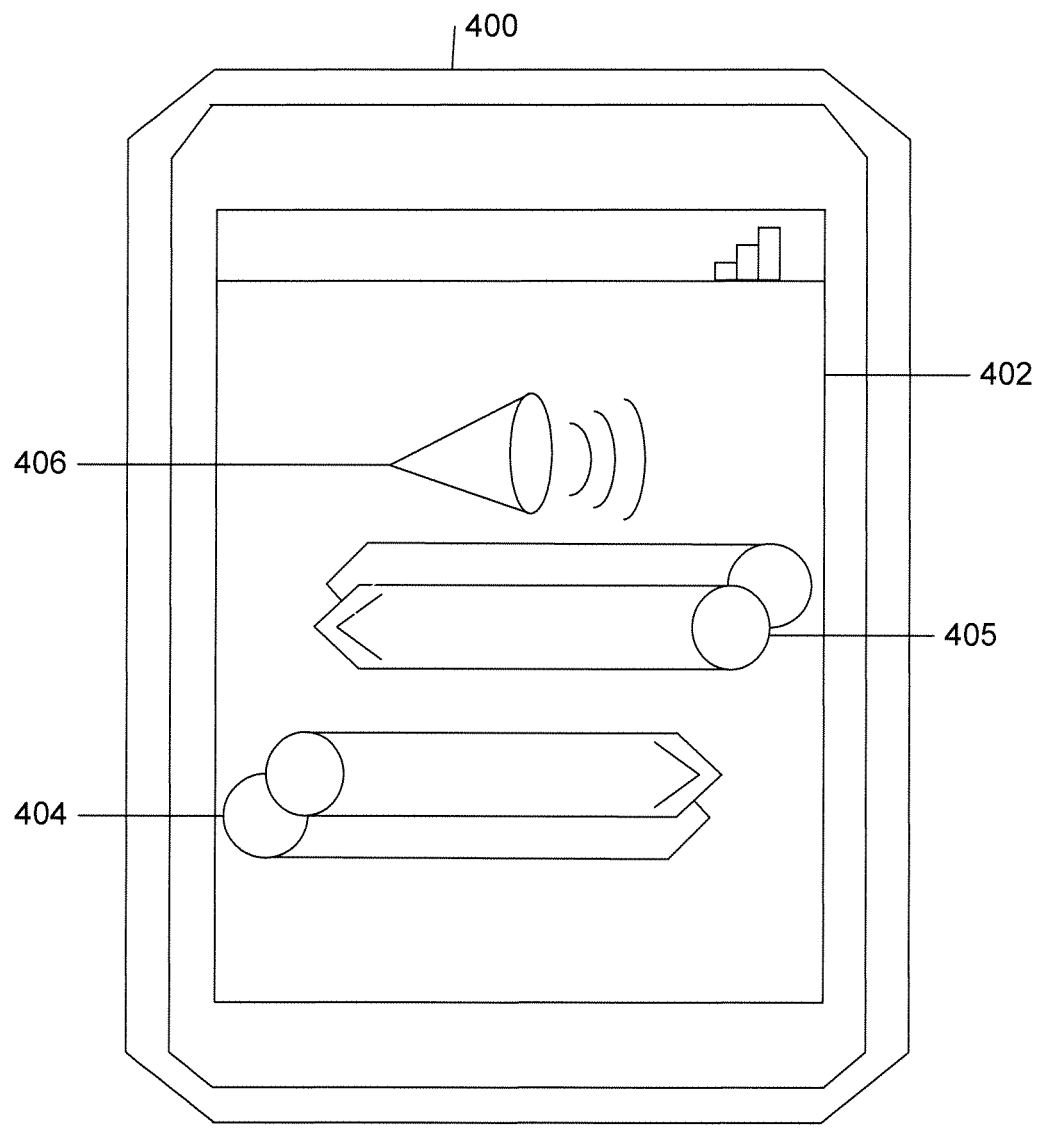
FIG. 4 illustrates commands that are executed based on different sequences of touch actions.

FIG. 4 illustrates commands that are executed based on different sequences of touch actions. In the example of FIG. 4, electronic device 400 includes an interface 402. A sequence of repeated swipe actions 404 that starts from the left side of interface 402 increases the volume of electronic device 400. Furthermore, a sequence of repeated swipe actions 405 that starts from the right side of interface 402 decreases the volume of electronic device 400.

In the example of FIG. 4, the number of swipe actions 404 and/or 405 detected within a threshold period of time is proportional to the amount the volume adjustment. Furthermore, the rate at which swipes actions 404 and/or 405 are performed is also proportional to the amount of volume adjustment. The sequence of swipe actions 404 and 405 may also be mapped to different commands based on the distance covered by each of the swipe actions 404 and/or 405. In one example, if each of swipe actions 404 covers half of the screen size of interface 402, then swipe actions 404 are mapped to a command to continuously increase the volume of electronic device 400. However, if at least three consecutive swipes of swipe actions 404 cover an entire screen size of interface 402, then the swipe actions correspond to a command to maximize the volume of electronic device 400. Similarly, if each of swipe actions 405 covers half of the screen size of interface 402, then swipe actions 405 are mapped to a command to continuously decrease the volume of electronic device 400. However, if at least three consecutive swipes of swipe actions 405 cover the entire screen size of interface 402, then the swipe actions correspond to a command to mute the volume of electronic device 400.

In other examples, different sequences of touch actions correspond to different commands. In the example of FIG. 4, visual indicator 406 is also provided to identify the command that is executed based on the sequence of touch actions. In other examples, audio, visual and/or other types of user interface elements may be provided to identify the executed command.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 5:
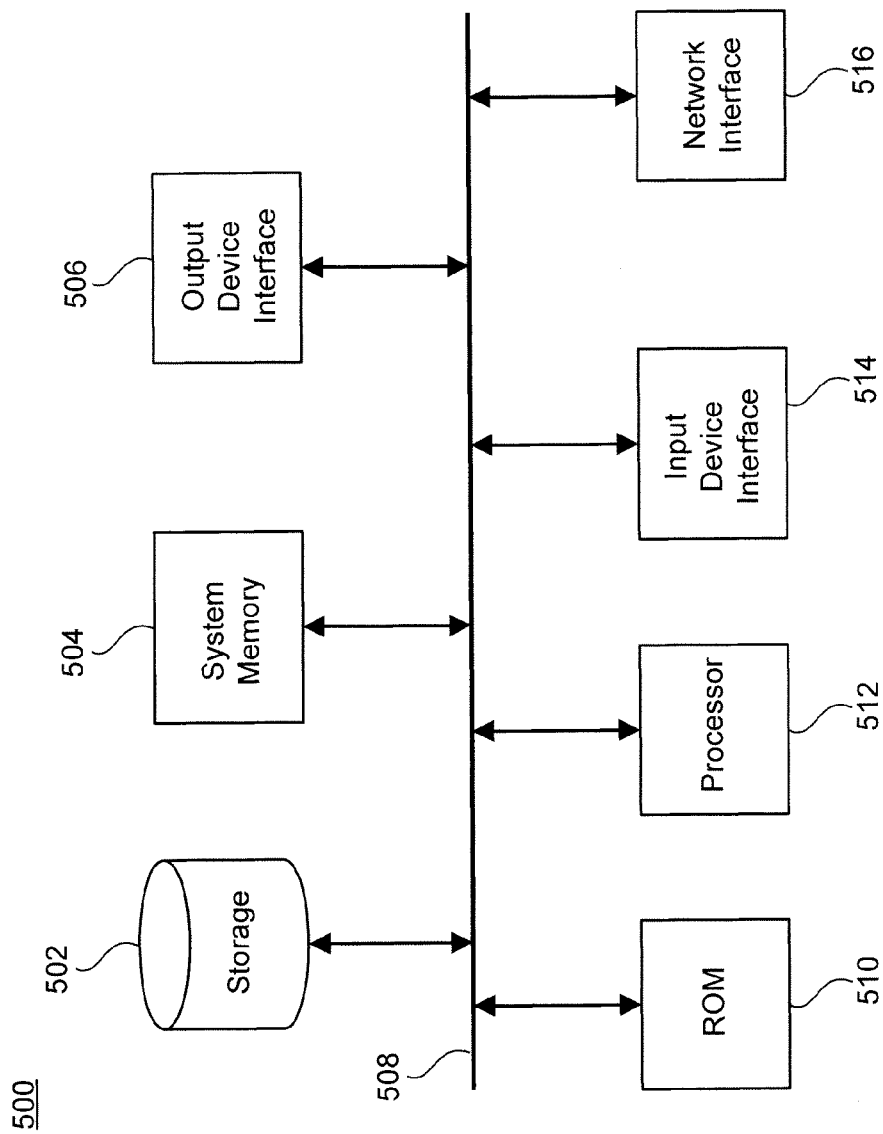
FIG. 5 conceptually illustrates an electronic system with which some implementations of the subject technology are implemented.

FIG. 5 conceptually illustrates an electronic system with which some implementations of the subject technology are implemented. Electronic system 500 can be a laptop computer, a desktop computer, smartphone, PDA, a tablet computer or any other sort of device 102, 104, and 106. Such an electronic system includes various types of computer readable media and interfaces for various other types of computer readable media. Electronic system 500 includes a bus 508, processing unit(s) 512, a system memory 504, a read-only memory (ROM) 510, a permanent storage device 502, an input device interface 514, an output device interface 506, and a network interface 516.

Bus 508 collectively represents all system, peripheral, and chipset buses that communicatively connect the numerous internal devices of electronic system 500. For instance, bus 508 communicatively connects processing unit(s) 512 with ROM 510, system memory 504, and permanent storage device 502.

From these various memory units, processing unit(s) 512 retrieves instructions to execute and data to process in order to execute the processes of the subject disclosure. The processing unit(s) can be a single processor or a multi-core processor in different implementations.

ROM 510 stores static data and instructions that are needed by processing unit(s) 512 and other modules of the electronic system. Permanent storage device 502, on the other hand, is a read-and-write memory device. This device is a non-volatile memory unit that stores instructions and data even when electronic system 500 is off. Some implementations of the subject disclosure use a mass-storage device (such as a magnetic or optical disk and its corresponding disk drive) as permanent storage device 502.

Other implementations use a removable storage device (such as a floppy disk, flash drive, and its corresponding disk drive) as permanent storage device 502. Like permanent storage device 502, system memory 504 is a read-and-write memory device. However, unlike storage device 502, system memory 504 is a volatile read-and-write memory, such a random access memory. System memory 504 stores some of the instructions and data that the processor needs at runtime. In some implementations, the processes of the subject disclosure are stored in system memory 504, permanent storage device 502, and/or ROM 510. From these various memory units, processing unit(s) 512 retrieves instructions to execute and data to process in order to execute the processes of some implementations.

Bus 508 also connects to input and output device interfaces 514 and 506. Input device interface 514 enables the user to communicate information and select commands to the electronic system. Input devices used with input device interface 514 include, for example, alphanumeric keyboards and pointing devices (also called "cursor control devices"). Output device interfaces 506 enables, for example, the display of images generated by the electronic system 500. Output devices used with output device interface 506 include, for example, printers and display devices, such as cathode ray tubes (CRT) or liquid crystal displays (LCD). Some implementations include devices such as a touchscreen that functions as both input and output devices.

Finally, as shown in FIG. 5, bus 508 also couples electronic system 500 to a network (not shown) through a network interface 516. In this manner, the computer can be a part of a network of computers (such as a local area network ("LAN"), a wide area network ("WAN"), or an Intranet, or a network of networks, such as the Internet. Any or all components of electronic system 500 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's electronic device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to an electronic device (e.g., for purposes of displaying data to and receiving user input from a user interacting with the electronic device). Data generated at the electronic device (e.g., a result of the user interaction) can be received from the electronic device at the server.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A computer-implemented method for processing touch actions, the method comprising:
    detecting, on a touch interface of an electronic device, a plurality of sequentially performed touch actions comprising a first touch action and a second touch action;
    determining an initiation location and a completion location on the touch interface for each of the first and second touch actions, wherein the initiation location of the first touch action and the completion location of the first touch action on the touch interface are different, and wherein the initiation location of the second touch action and the completion location of the second touch action on the touch interface are different;
    comparing the completion location of the first touch action and the initiation location of the second touch action;
    selecting a command based on the second touch action, and, based on whether the completion location of the first touch action is within a threshold distance from the initiation location of the second touch action; and
    executing the selected command on the electronic device.

2. The computer-implemented method of claim 1, further comprising:
    selecting another command based on the first touch action and the initiation location of the first touch action; and
    executing the selected other command on the electronic device.

3. The computer-implemented method of claim 2, wherein the selected other command is different from the command selected based on the determined completion location of the first touch action, the second touch action, and the determined initiation location of the second touch action.

4. The computer-implemented method of claim 3, wherein the initiation location of the first touch action is within a bezel section of the touch interface, and
    wherein the selected other command comprises displaying a launcher on the touch interface adjacent to the bezel section.

5. The computer-implemented method of claim 4, wherein the command selected based on the determined completion location of the first touch action, the second touch action, and the determined initiation location of the second touch action comprises displaying an application menu on the touch interface.

6. The computer-implemented method of claim 1, further comprising;
    determining a rate of movement for each of the first touch action and the second touch action; and
    comparing the determined rate of movement for the first touch action and the determined rate of movement for the second touch action,
    wherein the command is selected based on the comparison of the determined rates of movement for the first touch action and the second touch action.

7. The computer-implemented method of claim 6, wherein the command is selected based on the determined rate of movement for the first touch action being different from the determined rate of movement for the second touch action.

8. The computer-implemented method of claim 1, further comprising:
    comparing the initiation location of the first touch action and the initiation location of the second touch action, wherein the command is selected based on the initiation location of the first touch action and the initiation location of the second touch action being the same location on the touch interface.

9. The computer-implemented method of claim 8, further comprising:
comparing an action type of the first touch action and an action type of the second touch action,
wherein the command is selected based on the action type of the first touch action being the same as the action type of the second touch action.

10. The computer-implemented method of claim 1, wherein the selected command for the second touch action varies based on a type of the first touch action.

11. A non-transitory machine-readable medium storing executable instructions, which when executed by a processor cause the processor to perform a method comprising:
detecting, on a touch interface of an electronic device, a plurality of sequentially performed touch actions comprising a first touch action and a second touch action;
determining an initiation location and a completion location on the touch interface for each of the first and second touch actions, wherein the initiation location of the first touch action and the completion location of the first touch action on the touch interface are different, and wherein the initiation location of the second touch action and the completion location of the second touch action on the touch interface are different;
comparing the initiation location of the first touch action and the initiation location of the second touch action;
comparing an action type of the first touch action and an action type of the second touch action;
comparing the completion location of the first touch action and the initiation location of the second touch action;
selecting a command based on the second touch action, and based on whether the completion location of the first touch action is within a threshold distance from the initiation location of the second touch action; and
executing the selected command on the electronic device.

12. The non-transitory machine-readable medium of claim 11, the action types of the first and second touch actions are the same action type, and the command selected is different from another command associated with the initiation location and the action type of the first touch action alone.

13. The non-transitory machine-readable medium of claim 11, wherein the executable instructions further comprise:
selecting another command based on the first touch action and the initiation location of the first touch action; and
executing the selected other command on the electronic device.

14. The non-transitory machine-readable medium of claim 11, wherein the executable instructions further comprise:
determining a rate of movement for each of the first touch action and the second touch action; and
comparing the determined rate of movement for the first touch action and the determined rate of movement for the second touch action,
wherein the command is selected based on the comparison of the determined rates of movement for the first touch action and the second touch action.

15. The non-transitory machine-readable medium of claim 14, wherein the command is selected based on the determined rate of movement for the first touch action being different from the determined rate of movement for the second touch action.

16. An electronic device comprising:
a touch interface;
a processor;
a memory containing executable instructions which, when executed by the processor, cause the processor to:
detect, on the touch interface, a plurality of sequentially performed touch actions comprising a first touch action and a second touch action;
determine an initiation location and a completion location on the touch interface for each of the first and second touch actions, wherein the initiation location of the first touch action and the completion location of the first touch action on the touch interface are different, and wherein the initiation location of the second touch action and the completion location of the second touch action on the touch interface are different;
compare the completion location of the first touch action and the initiation location of the second touch action;
select a command based on the second touch action, and based on whether the completion location of the first touch action is within a threshold distance from the initiation location of the second touch action; and
executing the selected command on the electronic device.

17. The electronic device of claim 16, wherein executable instructions which, when executed by the processor, cause the processor to:
compare an action type of the first touch action and an action type of the second touch action,
wherein the command is selected based on the action type of the first touch action being the same as the action type of the second touch action.

* * * * *